(12) United States Patent
Heard et al.

(10) Patent No.: US 9,495,440 B2
(45) Date of Patent: Nov. 15, 2016

(54) METHOD, APPARATUS, AND COMPUTER PROGRAM PRODUCT FOR ROUTING FILES WITHIN A DOCUMENT MANAGEMENT SYSTEM

(71) Applicant: McKesson Financial Holdings, Hamilton (BM)

(72) Inventors: Eric Heard, Cumming, GA (US); Steven M Russell, Alpharetta, GA (US)

(73) Assignee: McKesson Financial Holdings, Hamilton (BM)

( * ) Notice: Subject to any disclaimer, the term of this patent is extended or adjusted under 35 U.S.C. 154(b) by 239 days.

(21) Appl. No.: 14/229,083

(22) Filed: Mar. 28, 2014

(65) Prior Publication Data

US 2015/0278338 A1 Oct. 1, 2015

(51) Int. Cl.
*G06F 17/30* (2006.01)

(52) U.S. Cl.
CPC ... *G06F 17/30598* (2013.01); *G06F 17/30174* (2013.01); *G06F 17/30578* (2013.01)

(58) Field of Classification Search
CPC ................................................ G06F 17/30598
See application file for complete search history.

(56) References Cited

U.S. PATENT DOCUMENTS

2002/0083079 A1* 6/2002 Meier ............... G06F 17/30011
2008/0133281 A1* 6/2008 Bolt ...................... G06Q 10/02
705/5

* cited by examiner

*Primary Examiner* — Etienne Leroux
*Assistant Examiner* — Cindy Nguyen
(74) *Attorney, Agent, or Firm* — Alston & Bird LLP

(57) ABSTRACT

A method, apparatus, and computer program product are provided for routing files within a document management system. The document management system may comprise or may otherwise communicate with an Optical Character Recognition (OCR) system and Full Text Search (FTS) indexing system. Files may be fed to a file routing apparatus with different priorities based on an originating source. The files may be routed for OCR processing and/or FTS indexing based on file and/or document types, licensing, and/or the like. Images and corresponding machine-readable text may be archived. Text may be FTS indexed so that the associated files may be identified and accessed by various client systems.

21 Claims, 11 Drawing Sheets

Fig. 7 B

METHOD, APPARATUS, AND COMPUTER PROGRAM PRODUCT FOR ROUTING FILES WITHIN A DOCUMENT MANAGEMENT SYSTEM

TECHNOLOGICAL FIELD

Example embodiments of the present invention relate generally to computer technology and, more particularly, to methods, apparatuses, and computer program products for routing files within a document management system. The document management system may comprise or may otherwise communicate with an Optical Character Recognition (OCR) system and Full Text Search (FTS) indexing system.

BACKGROUND

The widespread use of modern computing technology has led to an increasing amount of electronic information stored in a variety of formats. OCR systems convert image file formats to machine-readable text. In systems storing large volumes of information, full text searches requested by a user may result in slow processing time due to storing the data on databases and/or other lower level storage devices. As an alternative, FTS indexing systems process machine-readable text to build databases of search terminology, references, and other metadata to facilitate quicker and more accurate information retrieval and searching. Users may then perform key word searches and other requests for data and experience a quick response time, making the scanned documents and other image formats more usable.

In some document management systems, large amounts of files in different formats and from various sources may be received on an ongoing basis. Backlogs of files queued for OCR processing and FTS indexing may cause delays in the provision of machine-readable text and/or search indexing.

BRIEF SUMMARY OF SOME EXAMPLE EMBODIMENTS

Methods, apparatuses, and computer program products are therefore provided for routing files within a document management system. According to embodiments provided herein, received files may be prioritized, processed and indexed in a more efficient manner. A full text search database may be updated with newly received information, without wasting resources and performing unnecessary OCR processing or FTS indexing. Higher priority files may therefore be quickly uploaded, processed, indexed and made available for searching and viewing.

A method is provided including receiving an indication of a received file, queuing the received file into a file classifier queue, and with a processor, processing a file from the file classifier queue by a) determining at least one of a file type or a document type of the file from the file classifier queue, b) based on one or both of the file type or the document type, determining that the file from the file classifier queue is one of an unsupported file, an Optical Character Recognition (OCR) eligible file, or an Full Text Search (FTS) eligible file, c) in an instance in which the file from the file classifier queue is an OCR eligible file, queuing the OCR eligible file into an OCR queue for OCR processing, and d) in an instance in which the file from the file classifier queue is an FTS eligible file, queuing the FTS eligible file into a FTS queue for FTS indexing.

In some embodiments, the method further includes, asynchronously from the processing of the file from the file classifier queue, processing an OCRed file, wherein the OCRed file is a result of the OCR processing, and the processing of the OCRed file comprises determining whether the OCRed file comprises machine-readable text, in an instance in which the OCRed file comprises machine-readable text, queuing the OCRed file into the FTS queue, and in an instance in which the OCRed file does not comprise machine-readable text, preventing the OCRed file from being queued into the FTS queue.

In some examples, the method includes causing asynchronous processing of the OCR queue and asynchronous processing of the FTS queue. In some embodiments, the received files are received from one of a release server or a backload queue, and the method further comprises queuing received files from the release server with a higher priority than the received files from the backload queue.

In some examples, determining that the file from the file classifier queue is an OCR eligible file comprises determining that a source of the file from the file classifier queue has an OCR license. Determining that the file from the file classifier queue is an FTS eligible file may include determining that the file from the file classifier queue comprises machine-readable text. In some examples, determining that the file from the file classifier queue is an OCR eligible file is based on a user configuration of the document type.

A computer program product is provided, the computer program product including at least one non-transitory computer-readable medium having computer-readable program instructions stored therein, the computer-readable program instructions comprising instructions, which when performed by an apparatus, are configured to cause the apparatus to perform at least receiving an indication of a received file, queuing the received file into a file classifier queue; and processing a file from the file classifier queue by a) determining at least one of a file type or a document type of the file from the file classifier queue, b) based on one or both of the file type or the document type, determining that the file from the file classifier queue is one of an unsupported file, an Optical Character Recognition (OCR) eligible file, or an Full Text Search (FTS) eligible file, c) in an instance in which the file from the file classifier queue is an OCR eligible file, queuing the OCR eligible file into an OCR queue for OCR processing, and d) in an instance in which the file from the file classifier queue is an FTS eligible file, queuing the FTS eligible file into a FTS queue for FTS indexing.

An apparatus is provided, the apparatus comprising processing circuitry configured to cause the apparatus to perform at least receiving an indication of a received file, queuing the received file into a file classifier queue, and processing a file from the file classifier queue by a) determining at least one of a file type or a document type of the file from the file classifier queue, b) based on one or both of the file type or the document type, determining that the file from the file classifier queue is one of an unsupported file, an Optical Character Recognition (OCR) eligible file, or an Full Text Search (FTS) eligible file, c) in an instance in which the file from the file classifier queue is an OCR eligible file, queuing the OCR eligible file into an OCR queue for OCR processing, and d) in an instance in which the file from the file classifier queue is an FTS eligible file, queuing the FTS eligible file into a FTS queue for FTS indexing.

An apparatus is also provided, the apparatus including means for receiving an indication of a received file, means for queuing the received file into a file classifier queue, and means for processing a file from the file classifier queue by a) determining at least one of a file type or a document type of the file from the file classifier queue, b) based on one or both of the file type or the document type, determining that the file from the file classifier queue is one of an unsupported file, an Optical Character Recognition (OCR) eligible file, or an Full Text Search (FTS) eligible file, c) in an instance in which the file from the file classifier queue is an OCR eligible file, queuing the OCR eligible file into an OCR queue for OCR processing, and d) in an instance in which the file from the file classifier queue is an FTS eligible file, queuing the FTS eligible file into a FTS queue for FTS indexing.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those here summarized.

BRIEF DESCRIPTION OF THE SEVERAL VIEWS OF THE DRAWINGS

Figure 1:
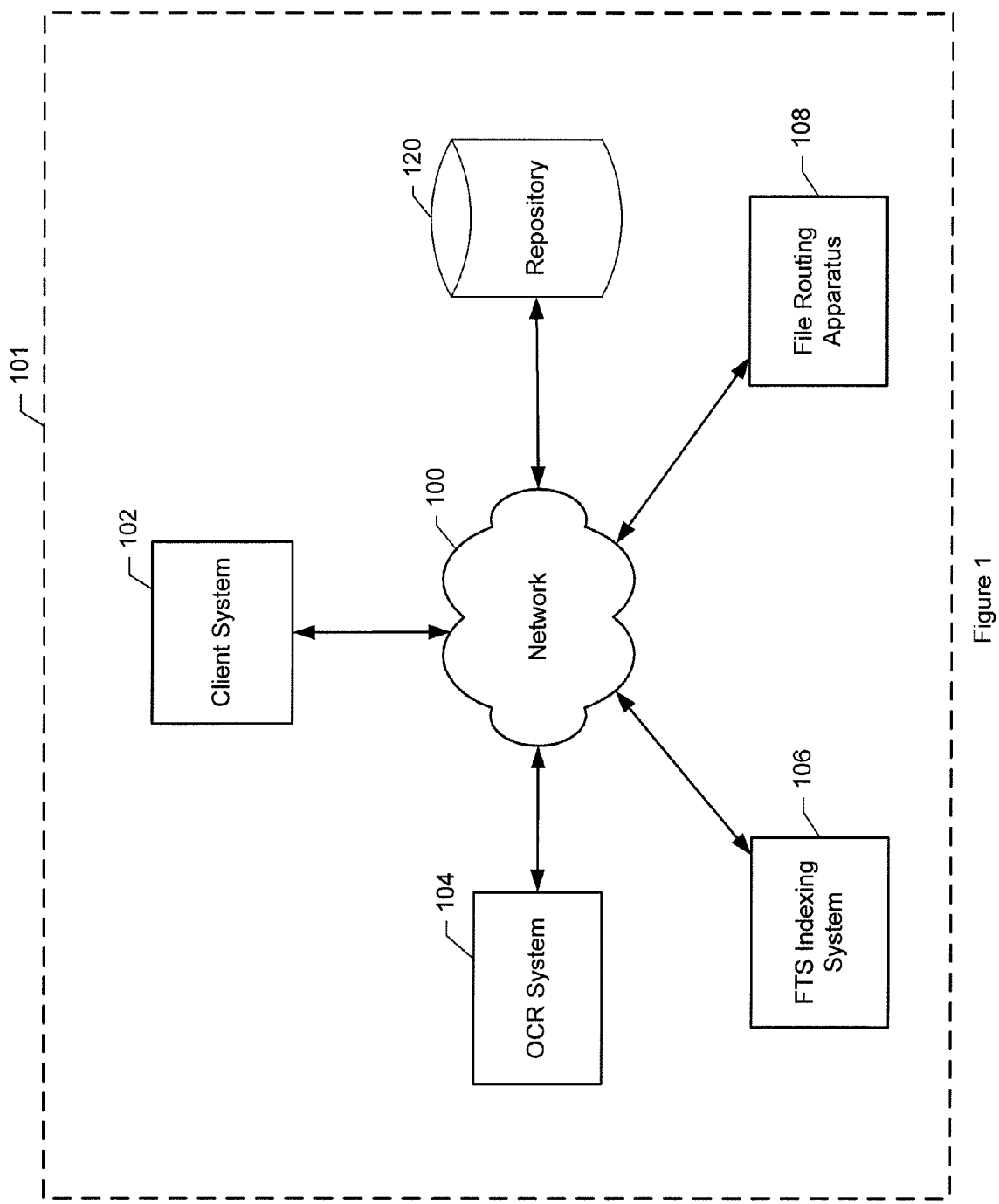
Figure 2:
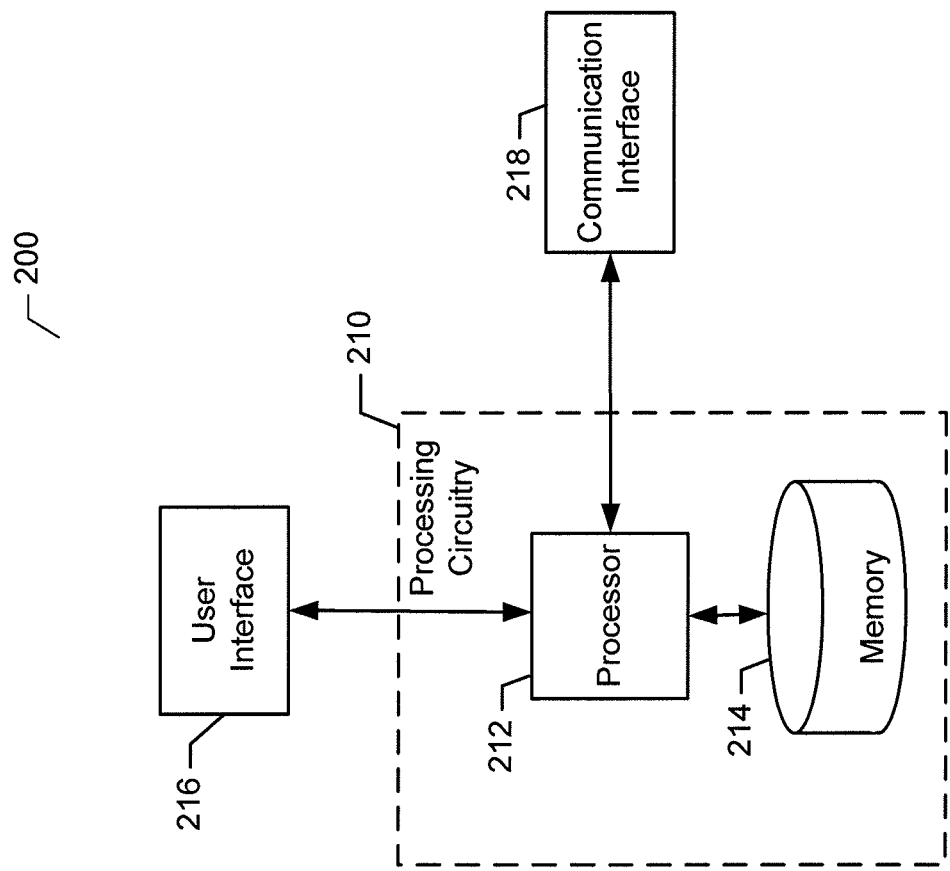
Figure 3:
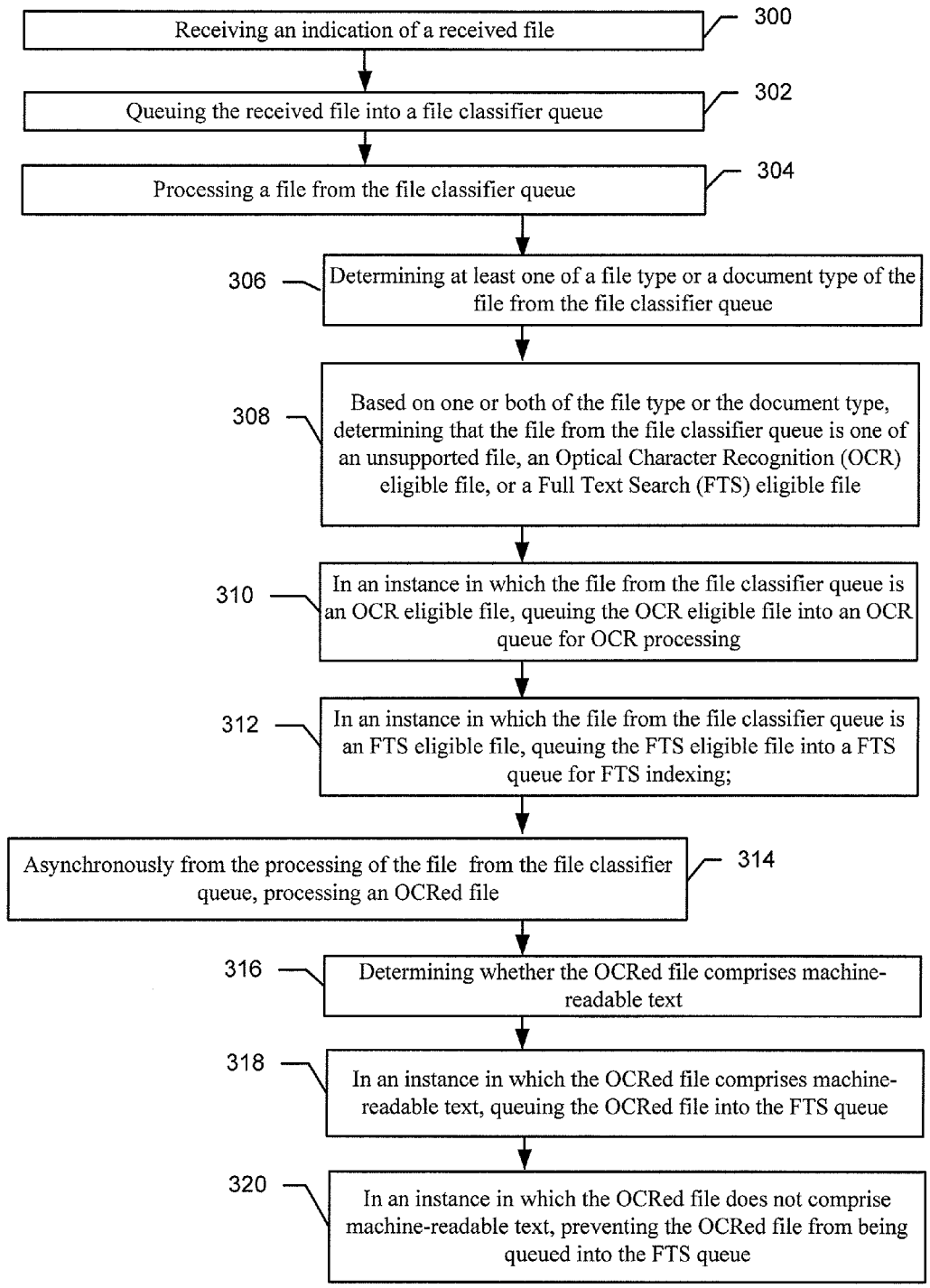
Figure 5:
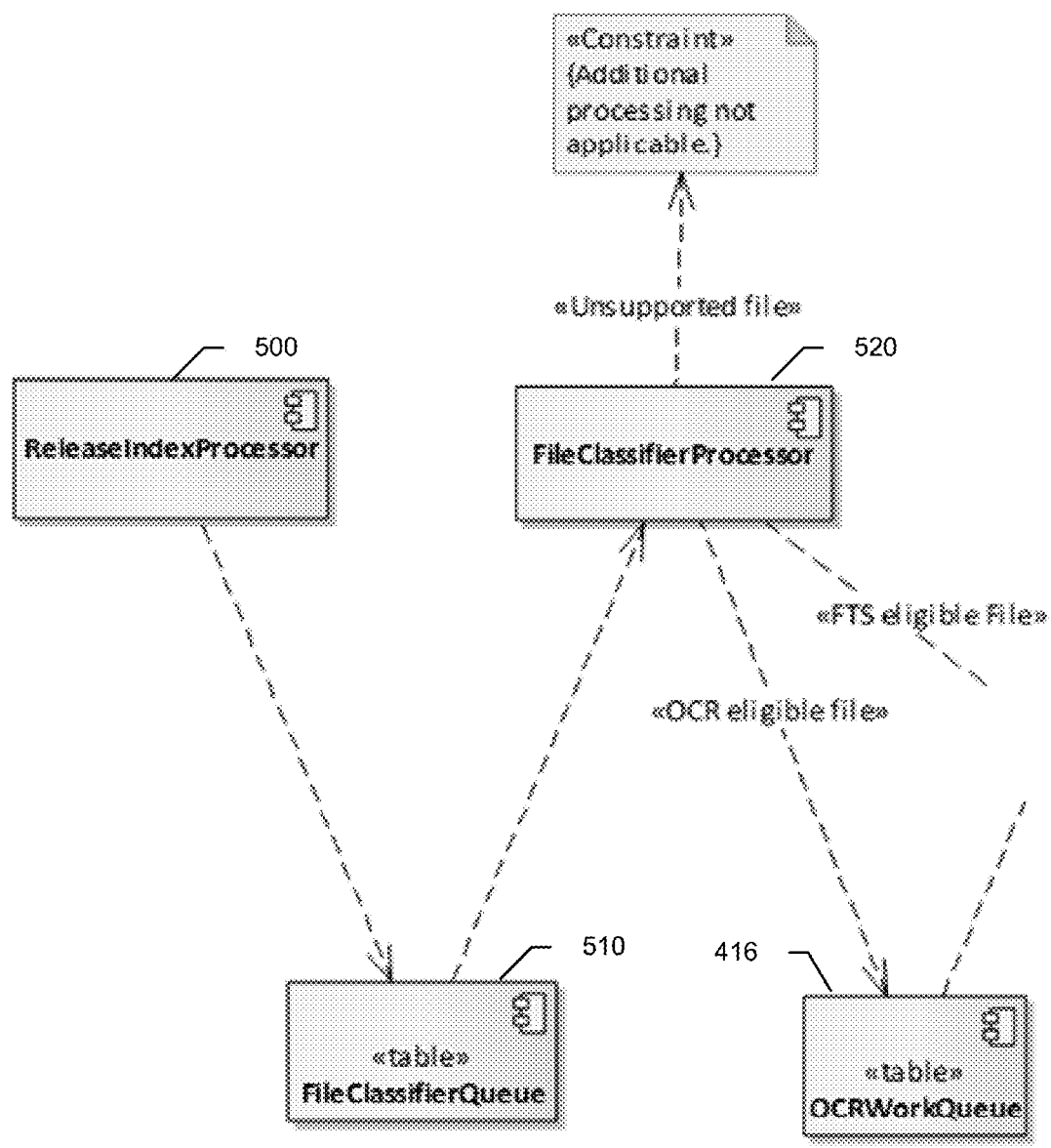
Figure 5:
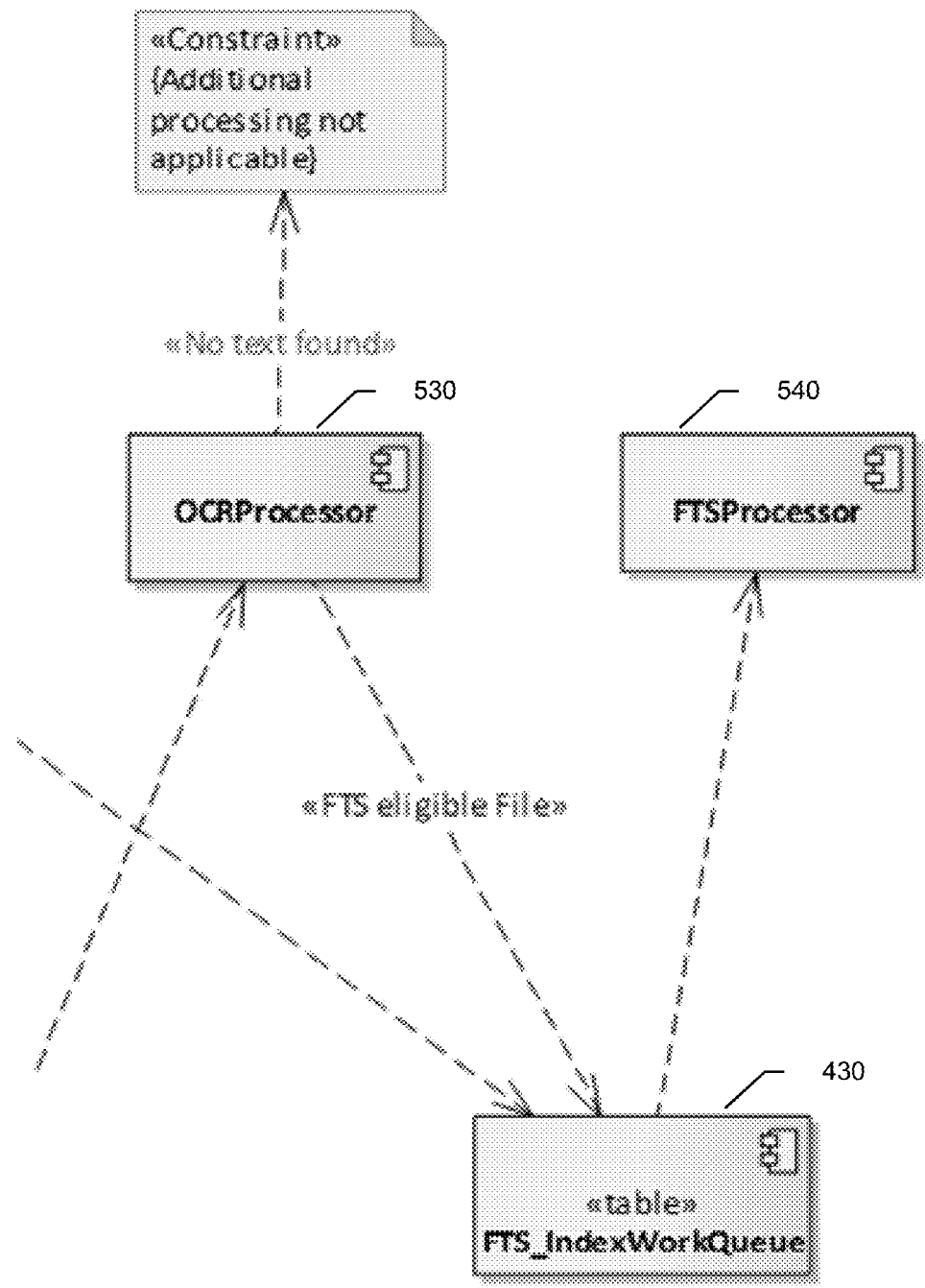
Figure 6:
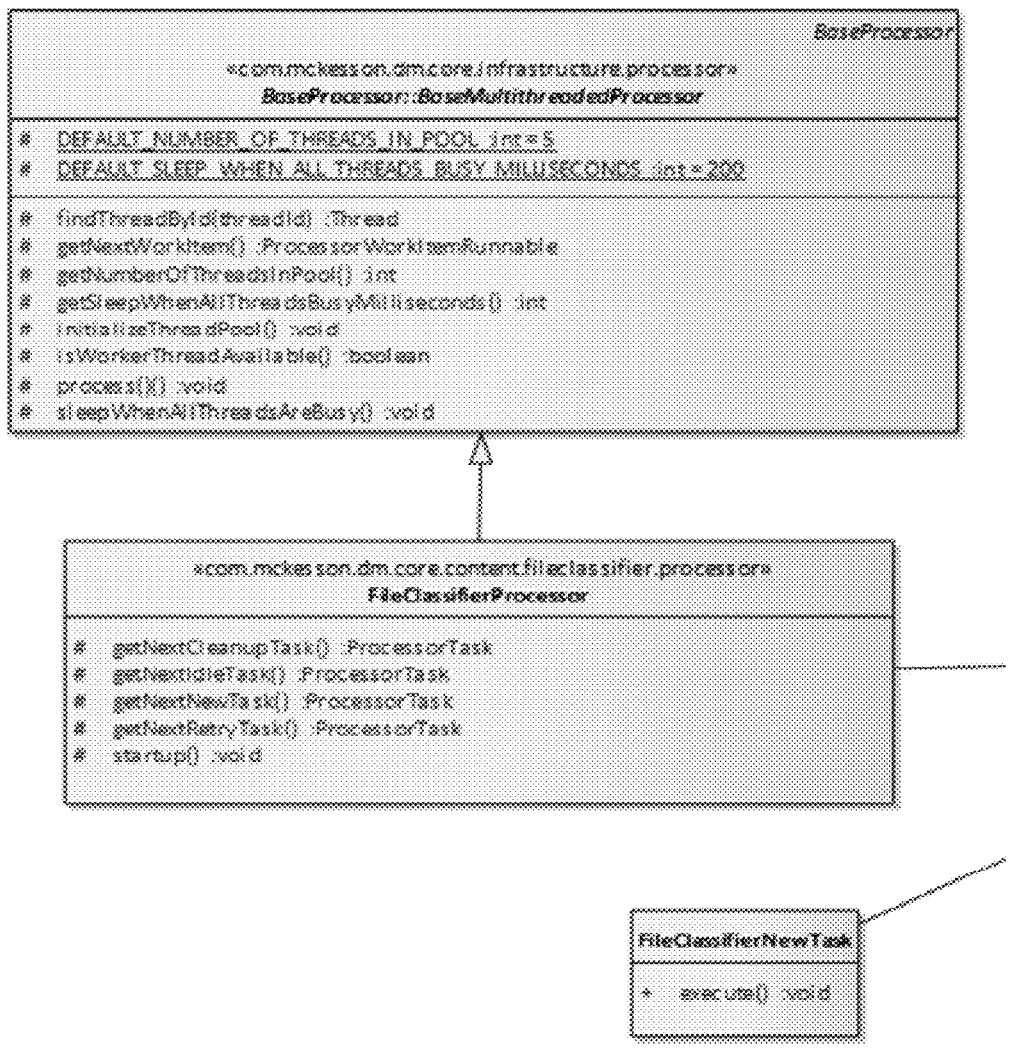
Figure 6:
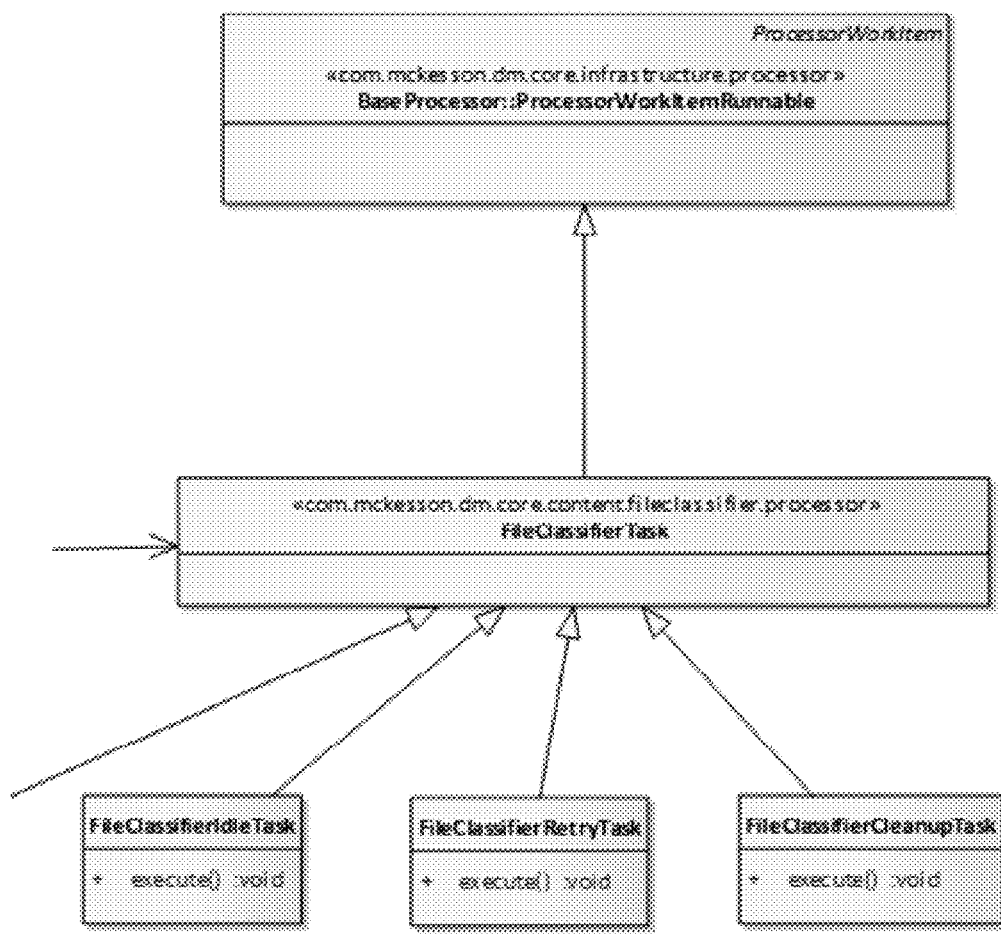
Figure 7:
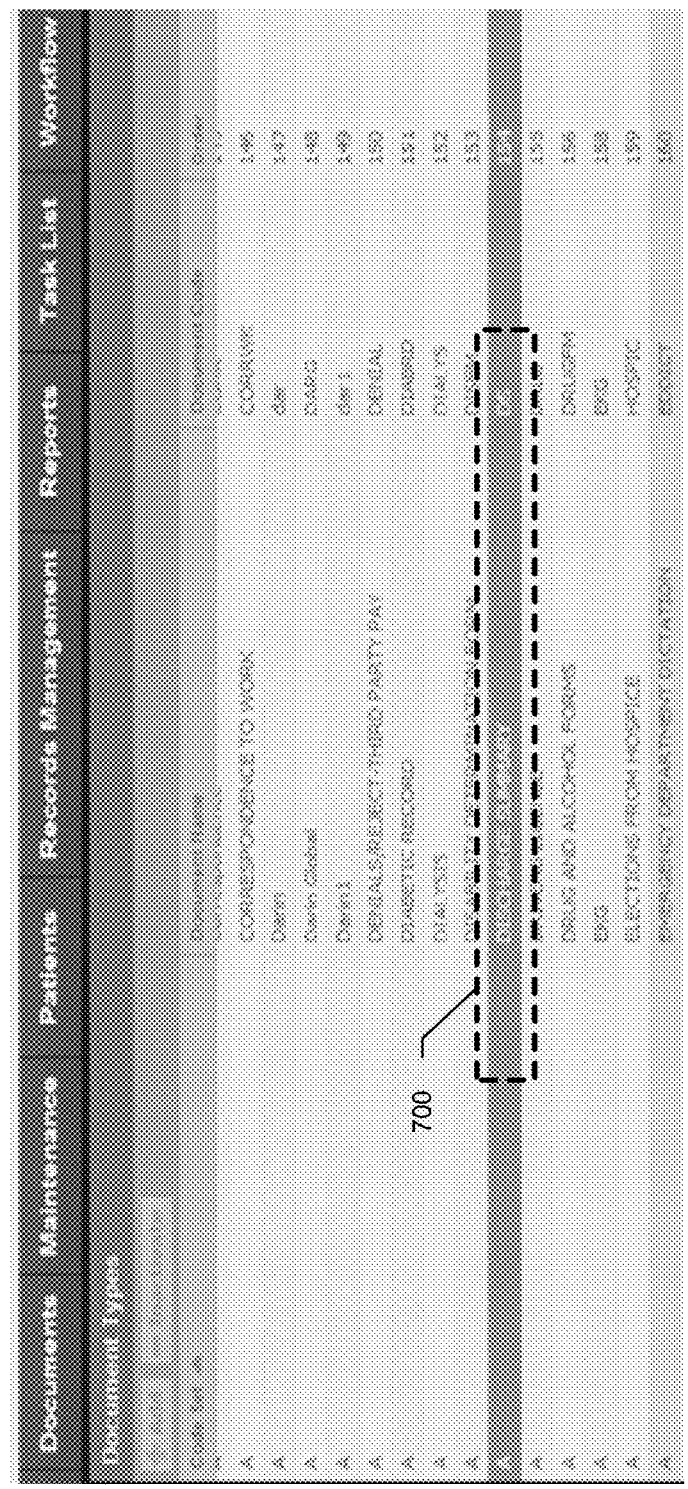

Having thus described embodiments of the invention in general terms, reference will now be made to the accompanying drawings, which are not necessarily drawn to scale, and wherein:

FIG. 1 is a block diagram of a system for routing files within a document management system according to some example embodiments;

FIG. 2 is a block diagram of an apparatus for routing files within a document management system according to some example embodiments;

FIG. 3 is a flowchart of operations for routing files within a document management system according to some example embodiments;

FIGS. 4A and 4B provide a flow diagram illustrating file routing within a document management system according to some example embodiments;

FIGS. 5A and 5B provide a flow diagram illustrating file routing within a document management system according to some example embodiments;

FIGS. 6A and 6B provide a class diagram of computer program code for routing files within a document management system according to some example embodiments; and FIGS. 7A and 7B provide an example display for configuring a document management system, according to some example embodiments.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used herein, where a computing device is described to receive data from another computing device, it will be appreciated that the data may be received directly from the other computing device and/or may be received indirectly via one or more intermediary computing devices, such as, for example, one or more servers, relays, routers, network access points, and/or the like. Similarly, where a computing device is described herein to transmit data to another computing device, it will be appreciated that the data may be sent directly to the other computing device or may be sent to the other computing device via one or more interlinking computing devices, such as, for example, one or more servers, relays, routers, network access points, and/or the like.

A method, apparatus, and computer program product are provided for routing files within a document management system, which may comprise or otherwise may be in communication with an OCR system and/or an FTS indexing system. A document management system may receive files from various client applications, and send the files to an OCR system to convert images into machine-readable text. In this regard, an image may be considered any file in a format lacking machine-readable text. Machine-readable text may be considered a sequence of electronic text that may be processed by a computing device.

In some examples, an image may include text in the image format, such that the text is not machine-readable. An OCR system may therefore convert a file lacking machine-readable text to a text file. As used herein, a text file may be considered a computer file comprising machine-readable text. Any file resulting from an OCR process may be considered an "OCRed file."

OCRed files may then be routed to an FTS indexing system so that the machine-readable text may be indexed, and the corresponding file may be efficiently searched. Images and their corresponding machine-readable text may be archived, while search indexes may be generated and/or maintained for efficient searching of the archived files. While referred to herein as a "search index," the output of the FTS indexing system 106 may comprise any FTS database, search tree, concordance, and/or any other data or data structure comprising metadata or other information relating to machine-readable text that may be used by a search engine and/or the like to more efficiently search for files. As such, a search index may be maintained by the FTS indexing system 106 to provide optimized searching and information retrieval.

In some examples, a received file may be a text file comprising embedded electronic or machine-readable text, such as a searchable PDF (Portable Document Format), HL7 (Health Level 7) or COLD (Computer Output to Laser Disk). Such files need not be processed by an OCR system because the files already comprise machine-readable text, and are therefore already formatted for FTS indexing. According to example embodiments, such text files may bypass OCR processing and may be routed to the FTS indexing system.

As another example, a received file may comprise information captured in an image format not comprising machine-readable text, such as JPG (Joint Photographic Experts Group), TIFF (Tagged Image File Format), PNG (Portable Network Graphics), an image-only PDF (e.g., which lacks machine-readable text), BMP (Bitmap File) and/or the like. Such files may need to be processed by an OCR system prior to being indexed, so that the FTS indexing system can interpret electronic text for indexing.

Performing OCR on images, followed by indexing search terms with an FTS indexing system may facilitate improved usability of information accessed via client applications, particularly by providing a full text search database or search index. However, in some examples, some received files may comprise images only and therefore neither OCR processing nor FTS indexing is necessary and could otherwise waste resources and create bottlenecks in the document management system.

As such, the methods, apparatuses, and computer program products provided herein provide for routing files within a document management system. According to embodiments provided herein, received files may be prioritized, processed and/or indexed in a more efficient manner. A search index may be updated with newly received information, without wasting resources and performing unnecessary OCR processing and/or FTS indexing.

The health care industry is an example industry that may benefit from embodiments provided herein. Clinics and other healthcare related entities may generate, modify, and/or receive electronic health records (EHRs), lab results, patient visit records, surgery reports and/or the like. Each client application may, in some examples, provide information in a variety of file formats. In an example embodiment, a client application may generate a record for uploading to a document management system such as one for managing medical records. As another example, a document management system may receive faxed and/or scanned documents, and route the files according to embodiments provided herein.

While the healthcare industry is referred to throughout as an example industry that may benefit from the routing of files within a document management system, it will be appreciated that embodiments provided herein may be applied to and implemented in systems configured to manage documents relating to any type of industry.

FIG. 1 illustrates a system 101 for providing file routing according to some example embodiments. System 101 may be a document management system, or may comprise or be comprised by a document management system. It will be appreciated that the system 101, as well as the illustrations in other figures, are each provided as an example of an embodiment(s) and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system, numerous other configurations may also be used to implement embodiments of the present invention.

In some embodiments, system 101 may be implemented as a document management system configured for receiving files from any number of client systems 102. Files may be routed to an OCR system 104 and/or an FTS system 106 via network 100, as directed by a file routing apparatus 108. Files, corresponding machine-readable text, and/or search indexes may be stored to repository 120.

The client system 102 may be any third party system or the like configured to upload or transmit files to the file routing apparatus 108. The client system 102 may, for example, be operative within a hospital or other medical facility network for generating such files and/or receiving such files from users of the client system 102. In some examples, the client system 102 may be embodied as a laptop computer, tablet computer, mobile phone, desktop computer, workstation, or other like computing device. An example user interface of a client system 102 is provided and described with respect to FIGS. 7A and 7B.

File routing apparatus 108 may be configured for receiving indications of received files from client system 102, and routing files to OCR system 104 and/or FTS indexing system 106, according to example embodiments. In some examples, file routing apparatus 108 may prevent a file from being routed to the OCR system and FTS indexing system 106.

File routing apparatus 108 may be embodied as or comprise one or more computing devices. In some example embodiments, file routing apparatus 108 may be implemented as a distributed system or a cloud based entity that may be implemented within network 100. In this regard, file routing apparatus 108 may comprise one or more servers, a server cluster, one or more network nodes, a cloud computing infrastructure, some combination thereof, or the like.

File routing apparatus 108 may be configured to store, or otherwise access, such as from repository 120, received files and route the files within system 101, such as described herein. It will be appreciated that the terminology "file routing" or "routing of files" as used herein may not only refer to the transmission of files, but in some embodiments, may be used to describe the transmission of a file identifier enabling identification of and access to the file, such as from repository 120. For example, routing a file to the OCR system 104 and/or FTS indexing system 106 may include causing transmission of the file, or the file identifier to the respective system such that the respective system may access a file associated with the file identifier. In this regard, "queuing" a file may similarly comprise queuing a file identifier enabling identification of and access to an associated file, or queuing the file itself. While example embodiments provided herein are described with respect to feeding and processing queues, it will be appreciated that queuing may refer to storing files and/or file identifiers in any type of data structure so that another process may access such a file or associated file.

OCR system 104 may be configured to perform OCR processing of image files as introduced above. In some examples, the OCR system 104 may process files, such as images received from clinics, other healthcare entities, and/or the like and routed by the file routing apparatus 108 to the OCR system 104. OCRed files, which may comprise machine-readable text, may be stored in association with the file, such as on repository 120. The OCRed file may be a file with a file extension such as OCR or TXT, for example.

FTS indexing system 106 may be configured to perform FTS indexing of machine-readable text. In some examples, the FTS indexing system 106 may process machine-readable text, as provided by OCR system 104 and/or client system 102, and routed to the FTS indexing system 106 by file routing apparatus 108. Resulting search indexes may be stored and/or maintained on repository 120, for example.

In some examples, the OCR system 104 and/or FTS indexing system 106 may be embodied on the same device as file routing apparatus 108. In some examples, the OCR system 104 and/or FTS indexing system 106 may be implemented remotely from the file routing apparatus 108. In some embodiments, the OCR system 104 and/or FTS indexing system 106 may be under the control of another entity than that of the file routing apparatus 108. The OCR system 104 and/or FTS indexing system 106 may be configured to operate independently of one another, or in some embodiments, may be configured to communicate directly or via network 100. Regardless of implementation, the file routing apparatus 108 may be configured to manage work queues for both OCR system 104 and/or FTS indexing system 106.

The repository 120 may be embodied as or comprise one or more computing devices configured to store data and provide data upon request to components of system 101. In some examples repository 120 may be configured to store received files, associated text files, and/or search indexes.

Network 100 may be embodied in a local area network, the Internet, any other form of a network, or in any combination thereof, including proprietary private and semi-private networks and public networks. The network 100 may comprise a wired network, wireless network (e.g., a cellular network, wireless local area network, wireless wide area network, some combination thereof, or the like), or a combination thereof, and in some example embodiments comprises at least a portion of the Internet.

FIG. 2 illustrates an example apparatus 200 that may implement a client system 102, OCR system 104, FTS indexing system 106, and/or file routing apparatus 108, in accordance with some example embodiments. However, it should be noted that the components, devices, and elements illustrated in and described with respect to FIG. 2 below may not be mandatory and thus some may be omitted in certain embodiments. For example, FIG. 2 illustrates a user interface 216, as described in more detail below, which may be provided by the client system 102, but may be optional in the OCR system 104, FTS indexing system 106, and/or file routing apparatus 108. Additionally, some embodiments may include further or different components, devices, or elements beyond those illustrated in and described with respect to FIG. 2.

Continuing with FIG. 2, processing circuitry 210 may be configured to perform actions in accordance with one or more example embodiments disclosed herein. In this regard, the processing circuitry 210 may be configured to perform and/or control performance of one or more functionalities of client system 102, OCR system 104, FTS indexing system 106, and/or file routing apparatus 108, in accordance with various example embodiments. The processing circuitry 210 may be configured to perform data processing, application execution, and/or other processing and management services according to one or more example embodiments. In some embodiments, client system 102, OCR system 104, FTS indexing system 106, and/or file routing apparatus 108, or a portion(s) or component(s) thereof, such as the processing circuitry 210, may be embodied or comprised as a computing device, e.g., an integrated circuit or other circuitry. The circuitry may constitute means for performing one or more operations for providing the functionalities described herein.

In some example embodiments, the processing circuitry 210 may include a processor 212, and in some embodiments, such as that illustrated in FIG. 2, may further include memory 214. The processing circuitry 210 may be in communication with or otherwise control a user interface 216, and/or a communication interface 218. As such, the processing circuitry 210 may be embodied as a circuit chip (e.g., an integrated circuit) configured (e.g., with hardware, software, or a combination of hardware and software) to perform operations described herein.

The processor 212 may be embodied in a number of different ways. For example, the processor 212 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. Although illustrated as a single processor, it will be appreciated that the processor 212 may comprise a plurality of processors. The plurality of processors may be in operative communication with each other and may be collectively configured to perform one or more functionalities of client system 102, OCR system 104, FTS indexing system 106, and/or file routing apparatus 108 as described herein. The plurality of processors may be embodied on a single computing device or distributed across a plurality of computing devices collectively configured to function as client system 102, OCR system 104, FTS indexing system 106, and/or file routing apparatus 108. In some example embodiments, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA, or the like, the processor 212 may be specifically configured hardware for conducting the operations described herein. Alternatively, as another example, when the processor 212 is embodied as an executor of software instructions, the instructions may specifically configure the processor 212 to perform one or more operations described herein.

In some example embodiments, the memory 214 may include one or more non-transitory memory devices such as, for example, volatile and/or non-volatile memory that may be either fixed or removable. In this regard, the memory 214 may comprise a non-transitory computer-readable storage medium. It will be appreciated that while the memory 214 is illustrated as a single memory, the memory 214 may comprise a plurality of memories. The plurality of memories may be embodied on a single computing device or may be distributed across a plurality of computing devices collectively configured to function as client system 102, OCR system, 104 FTS indexing system 106, and/or file routing apparatus 108. The memory 214 may be configured to store information, data, applications, instructions and/or the like for enabling client system 102, OCR system 104, FTS indexing system 106, and/or file routing apparatus 108 to carry out various functions in accordance with one or more example embodiments. For example, the memory 214 may be configured to buffer input data for processing by the processor 212. Additionally or alternatively, the memory 214 may be configured to store instructions for execution by the processor 212. As yet another alternative, the memory 214 may include one or more databases that may store a variety of files, contents, or data sets. For example, when apparatus 200 is implemented as file routing apparatus 108, the memory 214 may be configured to store files, file identifiers, and/or metadata. Among the contents of the memory 214, applications may be stored for execution by the processor 212 to carry out the functionality associated with each respective application. For example, when apparatus 200 is implemented as file routing apparatus 108, the memory 214 may be configured to store rules to enable the file routing apparatus 108 to route files amongst the component of system 101. In some cases, the memory 214 may be in communication with one or more of the processor 212, user interface 216, and/or communication interface 218, for passing information among components of client system 102, OCR system 104, FTS indexing system 106, and/or file routing apparatus 108. In some examples, memory 214 may include repository 120.

The user interface 216 may be in communication with the processing circuitry 210 to receive an indication of a user input at the user interface 216 and/or to provide an audible, visual, mechanical, or other output to the user. As such, the user interface 216 may include, for example, a keyboard, a mouse, a joystick, a display, a touch screen display, a microphone, a speaker, and/or other input/output mechanisms. As such, the user interface 216 may, in some example embodiments, provide means for user control of managing or processing data access operations and/or the like. For example, in instances in which apparatus 200 is implemented as a client system 102, a user may interact with the user interface 216 to upload a file to the file routing apparatus 108.

In some example embodiments in which client system 102, OCR system 104, FTS system 106, and/or file routing apparatus 108 is embodied as a server, cloud computing system, or the like, aspects of user interface 216 may be limited or the user interface 216 may not be present. Accordingly, regardless of implementation, the user interface 216 may provide input and output means in accordance with one or more example embodiments.

The communication interface 218 may include one or more interface mechanisms for enabling communication with other devices and/or networks. In some cases, the communication interface 218 may be any means such as a device or circuitry embodied in either hardware, or a combination of hardware and software that is configured to receive and/or transmit data from/to a network and/or any other device or module in communication with the processing circuitry 210. By way of example, the communication interface 218 may be configured to enable communication among client system 102, OCR system 104, FTS indexing system 106, file routing apparatus 108, and/or repository 120 via network 100. Accordingly, the communication interface 218 may, for example, include supporting hardware and/or software for enabling wireless and/or wired communications via cable, digital subscriber line (DSL), universal serial bus (USB), Ethernet, or other methods.

FIG. 3 is a flowchart illustrating example operations of the file routing apparatus 108 according to an example embodiment. As shown by operation 300, the file routing apparatus 108 may include means, such as communication interface 218 and/or the like, for receiving an indication of a received file. For example, the client system 102 may upload or otherwise transmit a file to the repository 120 and/or the file routing apparatus 108. In an instance in which the file is transmitted to the repository 120, the file routing apparatus 108 may receive an indication of the received file. In some examples, the file routing apparatus 108 may receive the file and may store the file on memory 214 or the repository 120, for example.

As shown by operation 302, the file routing apparatus 108 may include means, such as processor 212, memory 214, communication interface 218 and/or the like, for queuing the received file into a file classifier queue. In some embodiments, the file routing apparatus 108 may generate the file identifier, which may be stored in association with the file on repository 120.

The file classifier queue may be stored on memory 214, for example, and may be fed a file (or file identifier having an associated file) by the file routing apparatus 108 or by client system 102, for example. The file classifier queue may be processed by the file routing apparatus 108 as described below with respect to operations 304-310. While the file classifier queue, as well as the OCR queue and FTS queue (introduced below), are commonly described herein as a First-in-First-Out (FIFO) queue, it will be appreciated that any of the queues may be implemented as any type of data structure configured for indicating to another process or sub-process, files to be processed, or work to be performed. More specifically, the file classifier queue may comprise file identifiers of files to be classified by the file routing apparatus 108, while the OCR queue may comprise file identifiers of files to be processed by the OCR system 104. The FTS queue may comprise file identifiers of files to be indexed by the FTS indexing system 106. Any of the queues may be configured for storing files and/or file identifiers having an associated accessible file. In such an instance, the file identifier may be inserted into the file classier queue.

Returning to FIG. 3, as shown by operation 304, the file routing apparatus 106 may include means, such as processor 212, for processing a file from the file classifier queue. The processing of files from the file classifier queue may be performed asynchronously from the feeding of the queue. That is, in some embodiments, asynchronous sub-processes of the file routing apparatus 108, or different devices of the file routing apparatus 108 may control the queuing, retrieving, and processing of the file classifier queue. Processing of a file from the file classifier queue is described in further detail with respect to operations 306-312.

As shown by operation 306, the file routing apparatus 108 may include means, such as processor 212 and/or the like, for determining at least one of a file type or document type of the file from the file classifier queue. In this regard, the file type may indicate a format of the file (e.g., file extension), while the document type may describe the type of information in the file, and/or a layout of the file (e.g., locations of expected text compared to white space and/or non-text).

In some examples, determining the file type and/or document type may include accessing metadata stored in association with the file, such as on repository 120. The metadata may be generated on the client system 102 in response to uploading, scanning, and/or the like. For example, in some embodiments, a client application generating or receiving the file may generate the metadata including a file type and/or document type.

In some examples, the file routing apparatus 108 may infer the file type based on a file extension. In some embodiments, the file type may include a Multipurpose Internet Mail Extensions (MIME) type of the file.

The document type may be provided by the client system 102 (e.g., based on identification of a client application that generates or provides the file), or may be indicated by a user uploading the file to the client system 102 or file routing apparatus 108. Example document types may include discharge summary, dialysis report, prescription, and/or the like.

As shown by operation 308, the file routing apparatus 108 may include means, such as processor 212 and/or the like, for based on one or both of the file type or the document type, determining that the file from the file classifier queue is one of an unsupported file, an OCR eligible file, or an FTS eligible file. An supported file may be one that cannot be processed by the OCR system 104 or the FTS indexing system 106. An OCR eligible file may be in a format suitable to be processed by the OCR system 104. An FTS eligible file received from the file classifier queue may be one that is formatted to be indexed by the FTS indexing system 106 without first having to be processed by the OCR system 104.

FTS eligible files may comprise machine-readable text, and may include a file having a file extension of HL7, CLD (e.g., file extension of COLD), and/or TXT (e.g., file extension for a text file), for example. In some examples, a searchable PDF may comprise machine-readable text and may be considered an FTS eligible file. In this regard, the file routing apparatus 108 may determine a file is FTS eligible based on a file type.

OCR eligible files may include files which are not FTS eligible, but have an associated file type that is compatible with the OCR system 106, and/or files received from a source that is licensed with the OCR system 106. Example file types that may be considered OCR eligible may include JPG (Joint Photographic Experts Group), TIFF (Tagged Image File Format), PNG (Portable Network Graphics), PDF (Portable Document Format), BMP (Bitmap File) and/or the like. These file types may lack machine-readable text, but may be processed by the OCR system 106 so that text may be detected and processed to generate machine-readable text. Licensing information may be stored on repository 120 and/or provided by the client system 102 such as with the file.

OCR eligible files may include those in which an associated document type is configured for OCR processing. The configuration may be performed by an administrator of the client system 102, and/or file routing apparatus 108, for example. A user may therefore indicate which document types should be OCRed and which document types should not be OCRed. An example display for configuring a document type is provided in FIGS. 7A and 7B, described below.

In some examples, the file routing apparatus 108 may require that an OCR eligible file has an associated file type that is compatible with the OCR system 106, and the document type is configured for OCR processing. In some embodiments, the file routing apparatus 108 may base the OCR eligibility only on one of the file type or document type.

Files determined to be neither FTS eligible nor OCR eligible may be identified as unsupported files. Unsupported files may include file types of PAG, XML, or any other file type that cannot be processed by the OCR system 104 and/or the FTS system 106, such as an unstructured document.

As shown by operation 310, the file routing apparatus 108 may include means, such as processor 212, memory 214, communication interface 218 and/or the like, for in an instance in which the file from the file classifier queue is an OCR eligible file, queuing the OCR eligible file into an OCR queue for OCR processing. In this regard, the file from the file classifier queue may be routed to the OCR queue.

As shown by operation 312, the file routing apparatus 108 may include means, such as processor 212, memory 214, communication interface 218 and/or the like, for in an instance in which the file from the file classifier queue is an FTS eligible file, queuing the FTS eligible file into a FTS queue for FTS indexing. In this regard, the file from the file classifier queue that is identified to be FTS eligible may bypass the OCR queue and may be routed to the FTS queue. Such a queue may be fed by the file routing apparatus 108, and may be processed and/or indexed by the FTS indexing system 106.

As shown by operation 314, the file routing apparatus 108 may include means, such as processor and/or the like, for asynchronously from the processing of the file from the file classifier queue, processing an OCRed file. As described above, the OCRed file may be considered any resulting file of the OCR process and/or output of the OCR system 104. The OCR system 104 may retrieve or access files from the OCR queue, and perform OCR processing on the files in an attempt to extract machine-readable text. Such machine-readable text may be stored in association with the file (e.g., image and/or the like), such as on repository 120. Additionally or alternately, OCRed files (or identifying information of the OCRed files) may be provided to the file routing apparatus 108. The processing of an OCRed file by the file routing apparatus 108 is described in further detail with respect to operations 316-320.

As shown by operation 316, the file routing apparatus 108 may include means, such as processor and/or the like, for determining whether the OCRed file comprises machine-readable text. For example, a JPG file comprising only an x-ray image may be processed by the OCR system 106, but may be found to have no text, even within the image. In such an example, the OCRed file may not comprise machine-readable text. As an alternative example, an image comprising text may be processed by the OCR system 104 such that machine-readable text is extracted. The OCRed file may therefore comprise machine-readable text. Extracted machine-readable text may be stored on repository 120 in association with an image file (e.g., the received file from the client system 102), and in some embodiments, may be embedded in a file having a file extension of OCR.

Continuing to operation 318, the file routing apparatus 108 may include means, such as processor and/or the like, for in an instance in which the OCRed file comprises machine-readable text, queuing the OCRed file into the FTS queue. As described above, OCRed files may include machine-readable text. The machine-readable text may therefore be indexed by the FTS indexing system 106 such that a search index or other metadata on repository 120 may be updated and/or maintained. Various users, such as users of client system(s) 102 may therefore search and quickly access the files (including the text files and/or associated images) on the repository 120.

As shown by operation 320, the file routing apparatus 108 may include means, such as processor and/or the like, for in an instance in which the OCRed file does not comprise machine-readable text, preventing the OCRed file from being queued into the FTS queue. In some embodiments, as described with respect to operation 316, the file routing apparatus 108 may determine that the OCRed file does not comprise machine-readable text. Considering the example x-ray image introduced above that comprises no text, the corresponding OCRed file may lack machine-readable text. Therefore, there may be no value in routing the file to the FTS indexing system 106, because there is no machine-readable text to be indexed. The file routing apparatus 108 may therefore prevent the file from being routed to the FTS queue.

FIGS. 4A and 4B provide a flow diagram illustrating file routing within a document management system according to some example embodiments. Release Server Index Upload and Batch Compiler (RIB) 400 may be implemented on client system(s) 102, or otherwise may be configured to receive images from various client system(s) 102. In this regard, the RIB 400 may be implemented on the file routing apparatus 108, or may otherwise be in communication with the file routing apparatus 108 to feed the file classifier 402 and/or file classifier queue (not shown in FIGS. 4A and 4B).

Additionally, a backload work queue 404 may be configured to receive images, such as from a client system 102. Images may be fed to the file classifier 402 and/or the file classifier queue from the backload utility 406 and may include images captured in the past, and retrieved from an archive and/or repository 120, while images provided by the RIB 400 may be more recently captured or uploaded images. The images from the RIB 400 may therefore be given a higher priority than those from the backload queue 404 and/or backload utility 406. In some examples, images from the backload queue 404 and/or backload utility may only be queued in the file classifier queue when the file classifier queue is empty, has below a threshold number of images queued, and/or no images are available from the RIB 400 that have not already been queued in the file classifier queue.

In some examples, the RIB 400 may prioritize images received from various client systems 102. For example, images from RIB 400 that are associated with existing images or previously OCRed and/or indexed files, may be given a higher priority than a new image (e.g., an image not yet having an associated OCRed file), so that inaccurate information may be quickly corrected within the repository 120, and the search index may be updated.

The file classifier 402 may be a module implemented on the file routing apparatus 108 and may be configured for performing operations as described with respect to FIG. 3. For example, the file classifier 402 may be configured for determining a MIME type 410 of a received file, as described with respect to operation 306 above. In an example embodiment, file types of HL7, CLD, TXT, or any other file comprising machine-readable text may be routed directly to FTS work queue (FTS queue) 430. File types other than those comprising machine-readable text, such as PAG and/or PDF, for example, may be processed by the file classifier 402 to determine if the file is OCR eligible (e.g., as shown by decision block 412). In some examples, this determination may be made based on the file type. As shown by decision box 414, an OCR eligible file from a source having an OCR license may be fed to the OCR work queue (OCR queue) 416 to be processed by the OCR engine 418 (e.g., OCR system 104).

As shown by decision box 420, files identified as a PDF, searchable PDF and/or another file comprising machine-readable text, may bypass the OCR work queue and OCR engine and may be routed to the FTS work queue 430. The file classifier 402 and/or the file routing apparatus 108 may prevent incompatible files, such as files having a file type of PAG or XML, for example, from being routed to either of the OCR work queue 416 or FTS work queue 430, as shown by the end of process symbol 432. The FTS engine 434 (e.g., FTS indexing system 106) may index machine-readable text from the FTS queue as described herein.

A shown in area 440, images, associated OCRed files, and/or associated machine-readable text may be stored in association, such as on repository 120. Any of the files may be archived (442), purged (444), or accessed via a records management application (446). The records management application 446 may allow a user to delete, manage, or configure any of the files. A viewer 450, such as provided by client system 102, may allow access to view any of the files, and may quickly identify such files for viewing by searching for key terms such as indexed by the FTS engine 434.

Pages table 460 is a database table that may include links to documents in the system, such as to repository 120. In some embodiments, there may be any entry (e.g., link).

FIGS. 5A and 5B provide a flow diagram illustrating file routing within a document management system according to some example embodiments. The release index processor 500 (e.g., RIB 400) may feed the file classifier queue 510. The file classifier processer, which may be implemented on the file classifier 402 and/or the file routing apparatus 108, may be configured to route OCR eligible files to the OCR work queue 416, and/or FTS eligible files to the FTS work queue 430, as described herein.

The OCR processor 530 may be implemented on the OCR system 104, and may be configured to receive files from the OCR work queue 416, for OCR processing, as described herein. OCRed files (which may, in some embodiments be considered FTS eligible files, as they are now in a format for FTS indexing), may be routed to the FTS queue 430. The FTS processor 540, such as implemented on FTS indexing system 106, may index files from the FTS queue 430. The file classifier processor 520, OCR processor 530, and/or FTS processor 540 may operate independently from one another. That is, they may retrieve files from their respective queues and process the files asynchronously from other processors and queues.

FIGS. 6A and 6B provide a class diagram of computer program code for routing files within a document management system according to some example embodiments. The FileClassifierProcessor may implement a BaseProcessor class to continuously retrieve files and/or tasks for processing, as described herein. The corresponding computer program code may be implemented on the file routing apparatus 108, for example.

FIGS. 7A and 7B provide an example display for configuring a document management system and/or file routing apparatus 108, according to some example embodiments. The example display may be generated, at least in part by file routing apparatus 108 for example, and provided to a client system 102. A user of the client system 102 may utilize such a display to indicate whether a file of a particular document type 700 should be OCRed or not OCRed, such as with indicator 702. In this regard, a document type and/or OCR indicator may, in some embodiments, be provided by user input. Based on the example configuration provided in FIGS. 7A and 7B, subsequent files having an associated document type of "discharge summary" may be routed to the OCR system 104. A display such as that of FIGS. 7A and 7B may be used to configure various document types for routing to the OCR system 104.

According to embodiments provided herein, files received by the file routing apparatus 108 may be prioritized, processed and/or indexed in a more efficient manner. A search index may be updated with newly received information, without wasting resources and performing unnecessary OCR processing or FTS indexing. Files may be fed to work queues in instances in which the file routing apparatus 108 has identified the file as being in a format suitable to be processed by the respective system and/or processor. The functionality provided by the file routing apparatus 108 may therefore lead to increased efficiency throughout the system 101.

Figure 4:
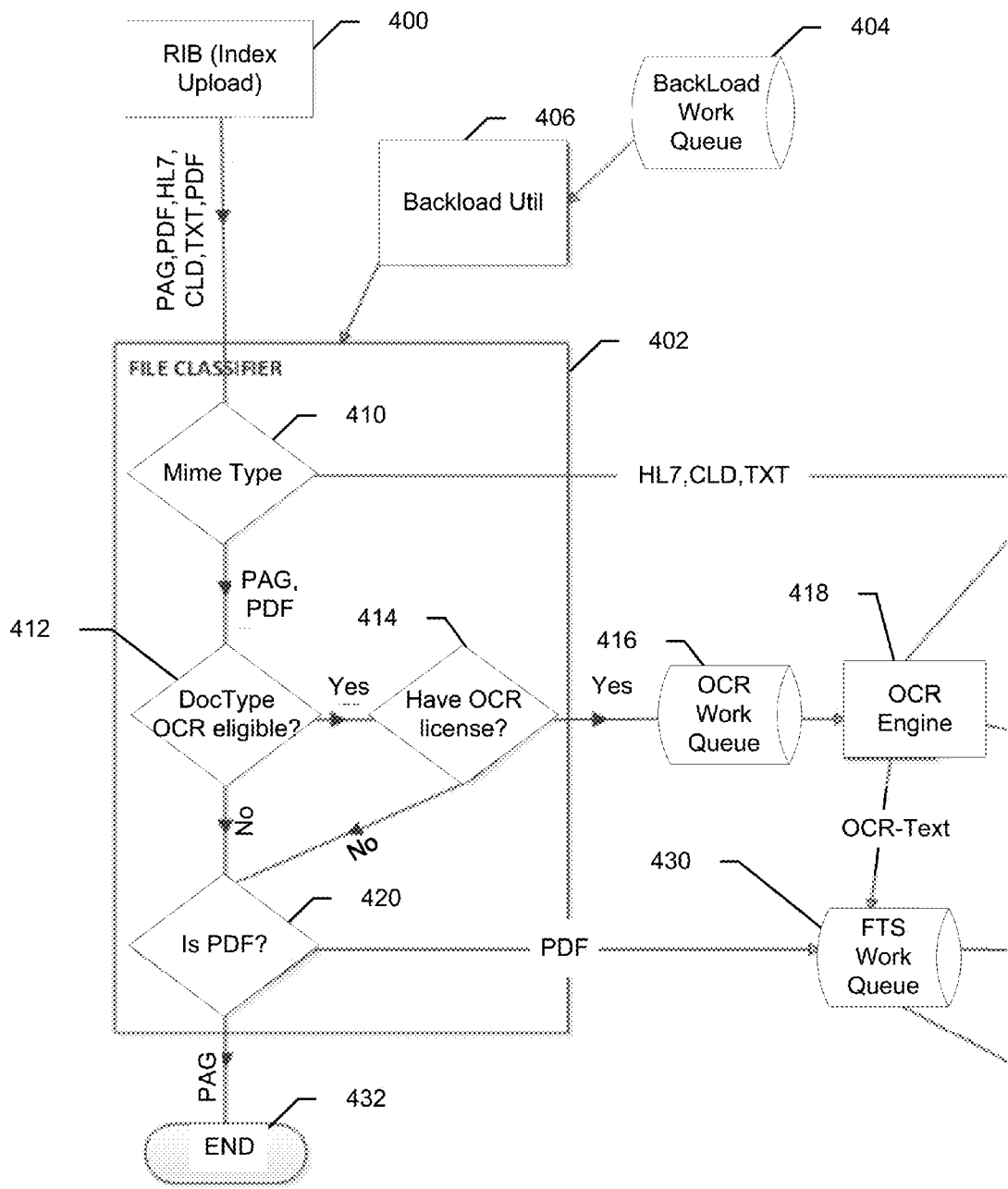
Figure 4:
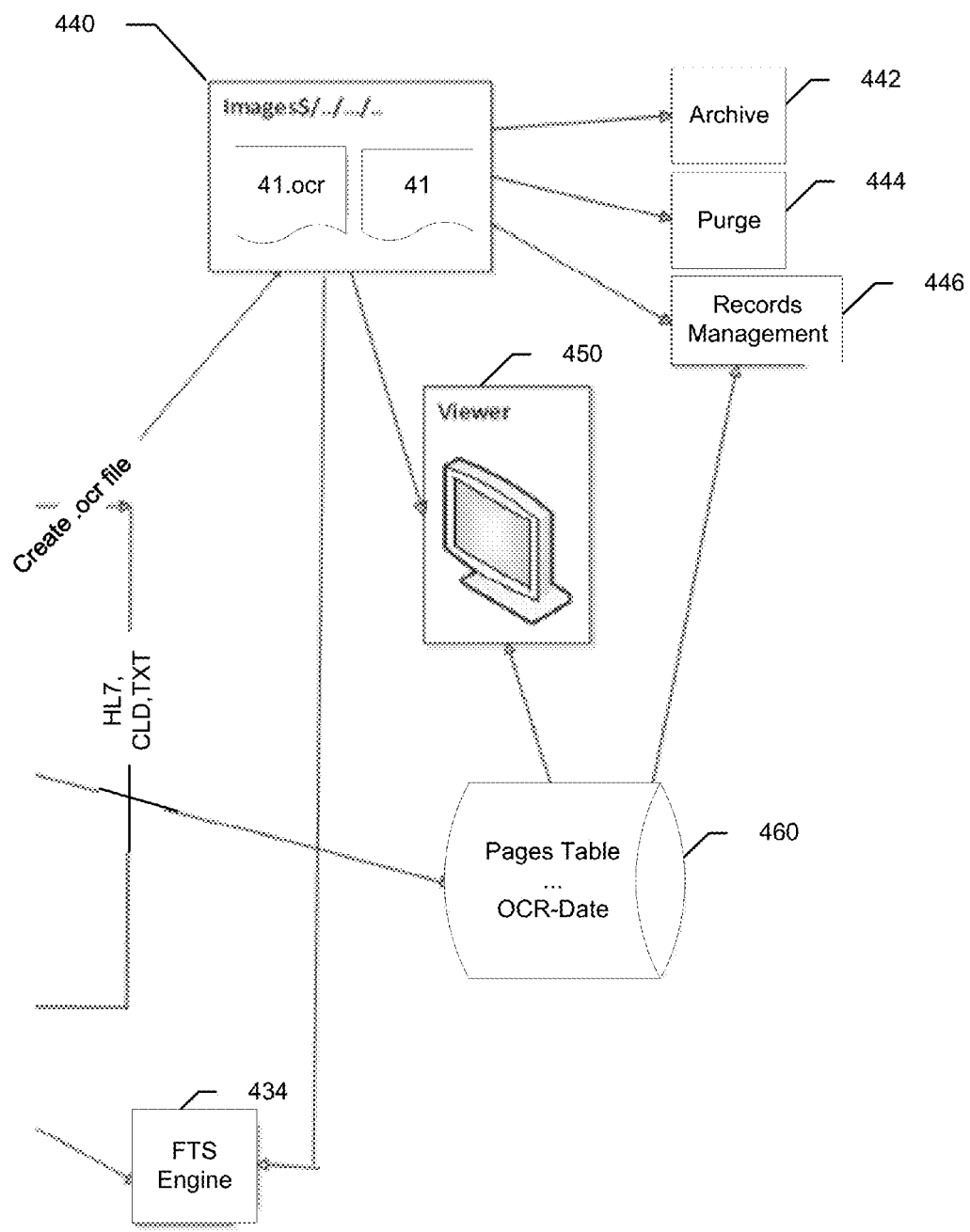

FIGS. 3 and 4 illustrate operations of a method, apparatus, and computer program product according to some example embodiments. It will be understood that each operation of the flowcharts or diagrams, and combinations of operations in the flowcharts or diagrams, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may comprise one or more memory devices of a computing device (for example, memory 214) storing instructions executable by a processor in the computing device (for example, by processor 212). In some example embodiments, the computer program instructions of the computer program product(s) which embody the procedures described above may be stored by memory devices of a plurality of computing devices. As will be appreciated, any such computer program product may be loaded onto a computer or other programmable apparatus (for example, client system 102, OCR system 104, FTS indexing system 106, and/or file routing apparatus 108) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, client system 102, OCR system 104, FTS indexing system 106, file routing apparatus 108, and/or other apparatus) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
  receiving an indication of a received file;
  queuing the received file into a file classifier queue; and
  with a processor, processing a file from the file classifier queue by:
    a) determining at least one of a file type or a document type of the file from the file classifier queue;
    b) based on one or both of the file type or the document type, classifying the file from the file classifier queue as an unsupported file, an Optical Character Recognition (OCR) eligible file, or a Full Text Search (FTS) eligible file;
    c) in an instance in which the file from the file classifier queue is an OCR eligible file, queuing the OCR eligible file into an OCR queue for OCR processing; and
    d) in an instance in which the file from the file classifier queue is an FTS eligible file, queuing the FTS eligible file into a FTS queue for FTS indexing.

2. The method of claim 1, further comprising, asynchronously from the processing of the file from the file classifier queue, processing an OCRed file, wherein the OCRed file is a result of the OCR processing, and the processing of the OCRed file comprises:
  determining whether the OCRed file comprises machine-readable text;
  in an instance in which the OCRed file comprises machine-readable text, queuing the OCRed file into the FTS queue; and
  in an instance in which the OCRed file does not comprise machine-readable text, preventing the OCRed file from being queued into the FTS queue.

3. The method of claim 1, further comprising:
  causing asynchronous processing of the OCR queue and asynchronous processing of the FTS queue.

4. The method according to claim 1, wherein the received files are received from one of a release server or a backload queue, and the method further comprises:
  queuing received files from the release server with a higher priority than the received files from the backload queue.

5. The method according to claim 1, wherein classifying the file from the file classifier queue as an OCR eligible file comprises determining that a source of the file from the file classifier queue has an OCR license.

6. The method according to claim 1, wherein classifying the file from the file classifier queue as an FTS eligible file comprises determining that the file from the file classifier queue comprises machine-readable text.

7. The method according to claim 1, wherein classifying the file from the file classifier queue as an OCR eligible file is based on a user configuration of the document type.

8. The method of claim 1, wherein the document type describes at least locations of expected text compared to white space in the file and wherein the file is classified based on the locations of the expected text.

9. The method of claim 1, wherein at least one of the file type or the document type is determined by accessing metadata stored in association with the file, and wherein the classification is based on at least the metadata stored in association with the file.

10. The method of claim 1, wherein the file type indicates a file type extension, and wherein the classification is based on at least the file type extension.

11. The method of claim 1, wherein at least one of the file type or the document type is based on identification of a client application having transmitted or generated the file, and wherein the classification is based on at least the client application having transmitted or generated the file.

12. A computer program product comprising at least one non-transitory computer-readable medium having computer-readable program instructions stored therein, the computer-readable program instructions comprising instructions, which when performed by an apparatus, are configured to cause the apparatus to perform at least:
  receiving an indication of a received file;
  queuing the received file into a file classifier queue; and
  processing a file from the file classifier queue by:
    a) determining at least one of a file type or a document type of the file from the file classifier queue;
    b) based on one or both of the file type or the document type, classifying the file from the file classifier queue as an unsupported file, an Optical Character Recognition (OCR) eligible file, or a Full Text Search (FTS) eligible file;

c) in an instance in which the file from the file classifier queue is an OCR eligible file, queuing the OCR eligible file into an OCR queue for OCR processing; and d) in an instance in which the file from the file classifier queue is an FTS eligible file, queuing the FTS eligible file into a FTS queue for FTS indexing.

13. The computer program product of claim 12, wherein the computer-readable program instructions are further configured to cause the apparatus to perform at least:

asynchronously from the processing of the file from the file classifier queue, processing an OCRed file, wherein the OCRed file is a result of the OCR processing, and the processing of the OCRed file comprises:

determining whether the OCRed file comprises machine-readable text;

in an instance in which the OCRed file comprises machine-readable text, queuing the OCRed file into the FTS queue; and in an instance in which the OCRed file does not comprise machine-readable text, preventing the OCRed file from being queued into the FTS queue.

14. The computer program product of claim 12, wherein classifying the file from the file classifier queue as an OCR eligible file comprises determining that a source of the file from the file classifier queue has an OCR license.

15. The computer program product of claim 12, wherein classifying the file from the file classifier queue as an FTS eligible file comprises determining that the file from the file classifier queue comprises machine-readable text.

16. The computer program product of claim 12, wherein classifying the file from the file classifier queue as an OCR eligible file is based on a user configuration of the document type.

17. An apparatus comprising processing circuitry configured to cause the apparatus to perform at least:

receiving an indication of a received file;

queuing the received file into a file classifier queue; and processing a file from the file classifier queue by:

a) determining at least one of a file type or a document type of the file from the file classifier queue;

b) based on one or both of the file type or the document type, classifying the file from the file classifier queue as an unsupported file, an Optical Character Recognition (OCR) eligible file, or a Full Text Search (FTS) eligible file;

c) in an instance in which the file from the file classifier queue is an OCR eligible file, queuing the OCR eligible file into an OCR queue for OCR processing; and d) in an instance in which the file from the file classifier queue is an FTS eligible file, queuing the FTS eligible file into a FTS queue for FTS indexing.

18. The apparatus of claim 17, wherein the processing circuitry is further configured to cause the apparatus to perform at least:

asynchronously from the processing of the file from the file classifier queue, processing an OCRed file, wherein the OCRed file is a result of the OCR processing, and the processing of the OCRed file comprises:

determining whether the OCRed file comprises machine-readable text;

in an instance in which the OCRed file comprises machine-readable text, queuing the OCRed file into the FTS queue; and in an instance in which the OCRed file does not comprise machine-readable text, preventing the OCRed file from being queued into the FTS queue.

19. The apparatus of claim 17, wherein classifying the file from the file classifier queue as an OCR eligible file comprises determining that a source of the file from the file classifier queue has an OCR license.

20. The apparatus of claim 17, wherein classifying the file from the file classifier queue as an FTS eligible file comprises determining that the file from the file classifier queue comprises machine-readable text.

21. The apparatus of claim 17, wherein classifying the file from the file classifier queue as an OCR eligible file is based on a user configuration of the document type.

* * * * *